United States Patent
Leuchs (10) Patent No.: US 12,381,629 B2
(45) Date of Patent: Aug. 5, 2025

(54) METHODS AND APPARATUS FOR SEQUENTIALLY TRANSMITTING SIGNALS OF POLARIZATION STATES OF LIGHT THROUGH AN OPTICAL FIBER

(71) Applicant: Max-Planck-Gesellschaft zur Förderung der Wissenschaften e.V., Munich (DE)

(72) Inventor: Gerd Leuchs, Wiesenthau (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 18/780,764

(22) Filed: Jul. 23, 2024

(65) Prior Publication Data
US 2024/0380495 A1 Nov. 14, 2024

Related U.S. Application Data (63) Continuation of application No. PCT/EP2023/052019, filed on Jan. 27, 2023.

(30) Foreign Application Priority Data

Jan. 28, 2022 (EP) .................... 22153991

(51) Int. Cl.
*H04B 10/532* (2013.01)
*H04B 10/25* (2013.01)
*H04B 10/70* (2013.01)

(52) U.S. Cl.
CPC ........... *H04B 10/532* (2013.01); *H04B 10/25* (2013.01); *H04B 10/70* (2013.01)

(58) Field of Classification Search
CPC ....... H04B 10/532; H04B 10/25; H04B 10/70
(Continued)

(56) References Cited

U.S. PATENT DOCUMENTS 6,917,427 B2 * 7/2005 Krause ................. G01M 11/336
356/365
2003/0086144 A1 5/2003 Chou et al.
(Continued)

FOREIGN PATENT DOCUMENTS

CN 103023569 A * 4/2013
CN 108398188 A * 8/2018 ................ G01J 4/00
(Continued)

OTHER PUBLICATIONS

Thorlabs; Using the Poincare sphere to represent the polarization state; Sep. 2020 attached; Thorlabs; pp. 1-2. (Year: 2020).*

*Primary Examiner* — Amritbir K Sandhu
(74) *Attorney, Agent, or Firm* — Laurence A. Greenberg; Werner H. Stemer; Ralph E. Locher (57) ABSTRACT

A method sequentially transmits signals of polarization states of light through an optical fiber. The optical fiber being a polarization preserving optical fiber. For each signal, a signal state is prepared as one out of a set of at least two non-orthogonal polarization states of light and sent through the optical fiber from a sender site to a receiver site. A method for quantum key distribution using polarization states of light is performed, wherein an alphabet of elementary information values is encoded in a set of non-orthogonal polarization states of light such that each elementary information value is represented by at least one of the polarization states. A classical message of elementary information values out of the alphabet is prepared, wherein the respective polarization states corresponding to the elementary information values of the classical message are prepared at a sender site as signal states.

10 Claims, 4 Drawing Sheets

(58) Field of Classification Search
USPC .......................................................... 398/65
See application file for complete search history.

(56) References Cited

U.S. PATENT DOCUMENTS

2020/0106521 A1\* 4/2020 Ye ...................... H04B 10/0775
2021/0399803 A1\* 12/2021 Fan ......................... H04J 14/06

FOREIGN PATENT DOCUMENTS

| CN | 109039594 A | \* | 12/2018 | ......... H04B 10/6162 |
| EP | 1026840 A1 | | 8/2000 | |
| WO | WO-2014042822 A2 | \* | 3/2014 | ........... H04B 10/501 |

\* cited by examiner

METHODS AND APPARATUS FOR SEQUENTIALLY TRANSMITTING SIGNALS OF POLARIZATION STATES OF LIGHT THROUGH AN OPTICAL FIBER

CROSS-REFERENCE TO RELATED APPLICATION

This application is a continuation, under 35 U.S.C. § 120, of copending International Patent Application PCT/EP2023/052019, filed Jan. 27, 2023, which designated the United States; this application also claims the priority, under 35 U.S.C. § 119, of European Patent Application EP 22 153 991.9, filed Jan. 28, 2022; the prior applications are herewith incorporated by reference in their entirety.

FIELD AND BACKGROUND OF THE INVENTION

The invention is related to a method for sequentially transmitting signals of polarization states of light through an optical fiber. The invention is further related to a method for quantum key distribution using polarization states of light, as well as to an apparatus for sequentially transmitting signals of polarization states of light.

Most of the cryptographical protocols that are currently used in practice are essentially based on the assumed complexity of certain mathematical functions, mainly so-called one-way functions, which are reasonably easy to calculate, but are deemed "impossible" to invert (i.e., the inverse function scales much worse than polynomial in the length of the function variables or outputs). The security of a cryptographical protocol then relies on the mentioned assumption that an eavesdropper will not have access to an encrypted message without knowing the underlying key, as the key and message are related to each other via such a function as described above.

However, there are mainly two possible loopholes to the security of those protocols: first, the security crucially relies on the assumption for the mathematical or numerical complexity of the inversion process to a cryptographic function. However, the major complexity assumptions employed in classical cryptography, such as "P vs. NP" are conjectures without any proof yet. It is not totally unreasonable to think that if some intelligence service was able to disprove these assumptions, or even find a polynomial-time algorithm for breaking the security of certain protocols, such an informational advantage might be kept secret. Second, due to the imminent arrival of quantum computing, functions whose inversion using known algorithms scales "worse-than-polynomial" might not give sufficient security anymore as quantum computing algorithms might precisely achieve a polynomial time scaling for problems currently scaling worse.

Quantum cryptography, or rather quantum key distribution (QKD), tries to overcome these problems by exploiting quantum correlations to the benefit of two communicating parties: a key for encrypting a message is encoded into the quantum correlations of a physical object such as light, shared between a sender and a receiver such that the receiver—after additional communication with the sender—can determine whether these quantum correlations of the physical system still exist after the physical object has passed through the unsecure domain. If this is not the case, then an interference by an eavesdropper cannot be excluded, and the transmission of the key may be stopped.

Transmitting the relevant information encoded in physical degrees of freedom of light appears to be among the most promising approaches for this kind of key distribution. In particular, protocols employing single photons as quantum bits ("qubits"), or phase and amplitude variables of light are being studied at the moment. However, single photons are somewhat difficult to generate deterministically, and phase and amplitude variables typically require a local oscillator as phase reference, which also need to be transmitted along with the signal states.

The polarization of light has the advantage of an easy-to-generate and easy-to-control signal state over single photons, as well as there is no need for a local oscillator. However, when transmitting a polarization state through an optical fiber, effects such as stress-induced birefringence may lead to a polarization mode dispersion (PMD), such that, e.g., an initially linear polarization may be transformed into a generally elliptic polarization. For most kinds of quantum communication, and for QKD in particular, a set of non-orthogonal initial quantum states is sent from a sender to a receiver, where the receiver performs a set of well-defined measurements on the received quantum state. For the mentioned case of polarization, PMD heavily restrains the receiver's possibility to properly identify the received polarization state.

SUMMARY OF THE INVENTION

Therefore, it is the object of the invention to provide a method for reliably transmitting polarization states of light through an optical fiber in a way that the initial polarization state that was sent can be retrieved with as high fidelity as possible. Furthermore, it is an object of the invention to provide a method for QKD, which shall be using polarization states of light to be transmitted through an optical fiber, and which shall be robust against influences from external conditions.

According to the invention, the first object is achieved by a method for sequentially transmitting signals of polarization states of light through an optical fiber, the optical fiber being a polarization preserving optical fiber, wherein for each signal, a signal state is prepared as one out of a set of at least two non-orthogonal polarization states of light, and sent through the optical fiber from a sender site to a receiver site. Embodiments of particular advantage, which may be inventive in their own right, are outlined in the dependent claims and in the following description.

According to the invention, the second object is achieved by a method for QKD using polarization states of light, wherein an alphabet of elementary information values is encoded in a set of non-orthogonal polarization states of light such that each elementary information value is represented by at least one of the polarization states, wherein a classical message of elementary information values out of the alphabet is prepared, wherein the respective polarization states corresponding to the elementary information values of the classical message are prepared at a sender site as signal states. The signal states are transmitted from the sender site to a receiver site through a polarization preserving optical fiber. At the receiver site, a polarization measurement is performed on each signal state that has been received after its propagation through the optical fiber, and wherein a classical key is retrieved from results of the polarization measurements by means of classical communication between the sender site and the receiver site.

The method for QKD according to the invention shares the advantages of the method for transmitting signals of polarization states according to the invention. Particular assets of the method for transmitting signals of polarization states, and of its embodiments may be transferred, in an analogous way, to the method for QKD, and vice versa.

The polarization of light denotes a vector perpendicular to the direction of propagation of light describing the direction along which the electric field is oscillating. Assuming a propagation of the light in z direction, the electric field of a plane wave with radial frequency ω and wave number k may be described as $$\vec{E}(z, t) = \begin{pmatrix} E_x \\ E_y \end{pmatrix} e^{i(kz-\omega t)}$$

wherein $E_x$ and $E_y$ denote the complex (phase-)amplitudes in the x and y directions. The corresponding Jones vector $\vec{J} = (E_x, E_y)^T / (\vec{E}\dagger \cdot \vec{E})$ can then be used to describe the polarization of $\vec{E}$, wherein horizontal and vertical linear polarization is represented by the two Jones vectors $(1,0)^T$ and $(0,1)^T$, respectively, diagonal polarizations are represented by the Jones vectors $(1, \pm 1)^T/\sqrt{2}$ and right and left hand circular polarizations are represented by the Jones vectors $(1, \pm i)^T/\sqrt{2}$.

Alternatively, polarization is often described in terms of the three Stokes parameters:

$$S_1 = \langle |E_x|^2 \rangle - \langle |E_y|^2 \rangle \quad (i)$$
$$S_2 = 2\text{Re}[\langle E_x E_y^* \rangle]$$
$$S_3 = -2\text{Im}[\langle E_x E_y^* \rangle],$$

wherein $E_x$, $E_y$ denote the amplitudes of the electric field in the x and y direction, and $\langle \cdot \rangle$ denotes the time average. The parameter $S_0 = \langle |E_x|^2 \rangle + \langle |E_y|^2 \rangle$ represents the total intensity of the light field. Note that $S_1$ represents the difference of the electric field fluctuations in the two main spatial directions of a reference frame perpendicular to the propagation of the light. In the quantum mechanical regime, i.e., when the fluctuations of the electric field are sufficiently weak, the Stokes parameters are to be replaced by corresponding non-commutative operators $\hat{S}_j$ (j=1, 2, 3) that generate or annihilate a photon in the respective polarization mode. Note that in the literature, the conventions of $S_j$ may be chosen in a different way than the one given in Eq. (i); such a difference, however, only consists in a global rotation.

In order to illustrate polarization states of light and operations on the polarization states, the so-called Poincaré sphere is used. The Poincaré sphere is a sphere of radius $P = \sqrt{S_1^2 + S_2^2 + S_3^2}$ in an orthogonal coordinate system spanned by the three polarization "directions" $S_1$, $S_2$, $S_3$ (these three Stokes parameters may also be normalized over $S_0$ to the total intensity, or over by P, so that the Poincaré sphere has unit radius).

Quantum communication and in particular QKD protocols often need to transmit non-orthogonal quantum states from a sender site to a receiver site, at the latter of which measurements are performed in order to identify the quantum states that have been sent, possibly by post processing using classical communication (in particular, for discarding inconclusive measurement results that may arise due to the non-zero overlap of the quantum states). In terms of polarization, this means that the polarization states to be sent are to be chosen out of a set of at least two non-orthogonal (and thus, partially overlapping) polarization states, such as horizontal and diagonal polarization, and after propagation through an optical fiber, a polarization measurement suitable for distinguishing the non-orthogonal polarizations shall be performed on the received states (in case of two non-orthogonal polarizations, such a measurement is preferably performed in the polarization subspace spanned by the two states of interest, forming a great circle, a geodesic, on the Poincaré sphere's surface of unit radius).

In an ordinary optical fiber (polarization "non-preserving"), two orthogonal polarization modes should ideally have the same phase velocity due to the rotational symmetry of the fiber. However, a small amount of crosstalk due to small (unintended) birefringence induced by temperature gradients or by mechanical stress, e.g., by bending, can occur, leading to the above-mentioned PMD. The crosstalk will be between the modes $E_x$ and $E_y$ of the electric field initially launched into the fiber. As a result, the initial polarization state of the light field represented by a vector $(S_1, S_2, S_3)^T$ on the Poincaré sphere is transformed to a different vector $(S_1', S_2', S_3')^T$ due to the propagation through the optical fiber. The degree of PMD, i.e., the exact mapping $(S_1, S_2, S_3)^T$ onto $(S_1', S_2', S_3')^T$ can strongly depend on external conditions for the optical fiber, such as temperature or mechanical strain.

As a consequence of the PMD and its dependence on the external conditions, the measurements initially "tailored" for most suitably distinguishing the non-orthogonal polarization states, may not be useful anymore after their propagation through the optical fiber (for the example of two non-orthogonal states, the great circle spanned by these and in which the measurements are preferably performed, might get "tilted" or "skewed" with respect to the main axes of the Poincaré sphere due to PMD). Two initial polarization states that are somewhat close on the Poincaré sphere prior to propagation will end up being scattered by the propagation through the fiber onto two output polarization states that still will be quite close, because the action of PMD is a series of many rotations around different axes with different rotation angles, i.e., a unitary evolution. However, it is a very cumbersome task to identify the exact influence of the PMD on these polarization states in order to adjust the polarization measurements for identifying the non-orthogonal signal states accordingly, as the geodesic arc between them will in general have changed position and orientation. Thus, this task generally cannot be performed without an additional noise penalty due to quantum uncertainty reasons.

This is where the invention comes into play: a polarization preserving optical fiber can preserve two orthogonal polarization eigen states, e.g., horizontal and vertical linear polarization. These polarizations define a direction on the Poincaré sphere, intersecting its surface at two opposite points, and thus, define a subspace the two elements of which are these two polarizations (which therefore is essentially zero dimensional), each of which is fully preserved against (i.e., unaffected by) any sort of PMD from propagation through the fiber. The representation of this subspace on the Poincaré sphere in the following shall be denoted as preserved polarization subspace. If the initial polarization state to be transmitted through the polarization preserving fiber lies in the preserved polarization subspace, it is fully protected against a PMD, and thus stays in the preserved polarization subspace (i.e., the polarization remains the same) even after the propagation through the polarization preserving optical fiber.

The above-mentioned movement of an arbitrary polarization state on the Poincaré sphere surface induced by PMD as a consequence of the propagation through a polarization preserving optical fiber then results to be restricted to a rotation around the axis defined by the preserved polarization subspace.

In the space spanned by $S_1$, $S_2$ and $S_3$ on the Poincaré sphere, the representation of any polarization state (i.e., any three-component vector) can be decomposed into one component that lies in the preserved polarization subspace, and another component that lies in a perpendicular subspace with respect to the preserved polarization subspace, i.e., in a (planar) subspace which is perpendicular to the protected polarization subspace (the magnitude of this component, i.e., its "length" is defined by the intersection of the surface of the Poincaré sphere with said plane). The action of PMD on the component in the preserved polarization subspace is the identity (as this subspace precisely is not affected by the PMD), and the action of the PMD on the component in the perpendicular subspace is then the mentioned rotation.

So even though a polarization preserving optical fiber does only protect two specific orthogonal polarization eigenstates against PMD, while other polarization states will be affected by the PMD, such an optical fiber has also advantages for the transmission of non-orthogonal (polarization) signal states, as the action of the PMD onto them on the Poincaré sphere is a mere rotation about the preserved eigenstates.

Therefore, the representation of any initial polarization on the Poincaré sphere, when given by a point on a circle around the direction defined by the preserved polarization subspace, will remain on this circle when propagating through the polarization preserving optical fiber and experiencing PMD.

Thus, any circle (small circles and great circle) on the surface of the Poincaré sphere surrounding and perpendicular to the direction of the preserved polarization subspace (i.e., the circle's center lies on the intersection line of the circle plane and the preserved polarization subspace) is then a protected subspace on its own in the sense that a polarization whose representation on the Poincaré sphere lies on such a circle, upon propagation through the polarization preserving fiber and the PMD resulting therefrom, will be transformed to another polarization state whose representation remains on that circle on the Poincaré sphere. Thus, depending on the preserved polarization subspace of the optical fiber, each initial state lies in such a protected space. This space shall be denoted protected Poincaré space in the following.

Figure 1A:
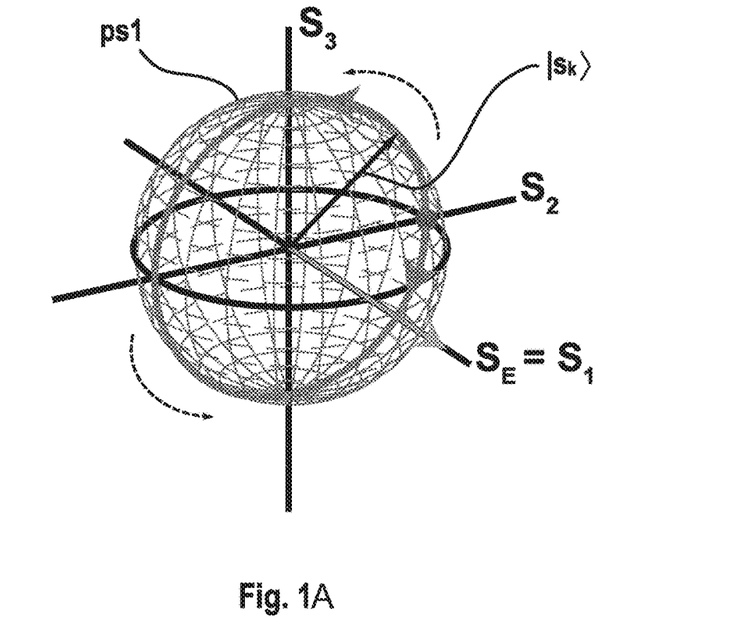
FIG. 1A is an illustration showing a Poincaré sphere for a propagation of a polarization state through an optical fiber preserving linear polarization.
Figure 1B:
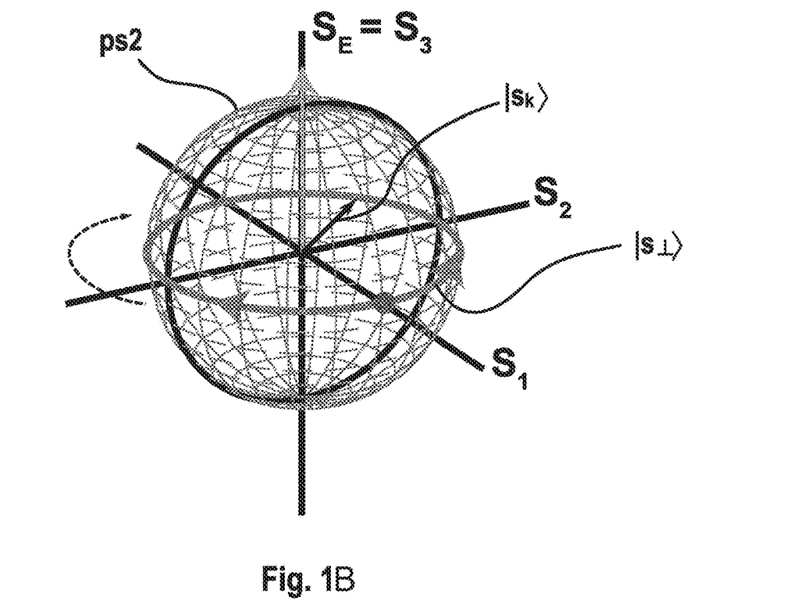
FIG. 1B is an illustration showing the Poincaré sphere for the propagation of the polarization state through the optical fiber preserving circular polarization.

This concept is shown schematically in FIGS. 1A and 1B, in which respective Poincaré spheres ps1, ps2 are shown in a Cartesian space spanned by the Stokes parameters $S_1$, $S_2$ and $S_3$.

The Poincaré sphere ps1 of FIG. 1A corresponds to the propagation of polarization states through an optical fiber which preserves a linear polarization with respect to the fiber axis, i.e., a linear polarization in the plane x-y perpendicular to the fiber axis which shall be in z direction. In case the axes x and y of the optical fiber are chosen properly, a preserved polarization subspace $S_E$ in this case coincides with the axis of the Stokes parameter $S_1$, i.e., $S_1=S_E$ (for any other choice of the axes x-y, the protected polarization subspace has a different orientation in the plane spanned by $S_1$ and $S_2$). In the present case, the preserved polarization subspace $S_E$ is such that horizontal polarizations (+$S_1$) and vertical polarizations (−$S_1$) remain unaffected by the PMD.

The "diagonal" polarizations represented by $S_2$, as well as the left- and right-hand circular polarizations represented by $S_3$ are spanning a perpendicular Poincaré subspace $S_\perp$ which is perpendicular to the preserved polarization subspace $S_E$.

A polarization $S_\perp \ni S_k = \cos 2\theta_k S_2 + \sin 2\theta_k S_3$ (or a corresponding polarization state $|s_k\rangle$) out of the perpendicular Poincaré subspace $S_\perp$ is then rotated in the perpendicular Poincaré subspace $S_\perp$, as indicated by the dashed arrows (note the relation of the double rotational angle for a Stokes parameter for a polarization rotation in real space).

The Poincaré sphere ps2 of FIG. 1B corresponds to the propagation of polarization states through an optical fiber which preserves a circular polarization with respect to the fiber axis, i.e., a circular polarization in the plane x-y perpendicular to the fiber axis. The preserved polarization subspace $S_E$ in this case coincides with the axis of the Stokes parameter $S_3$, i.e., $S_3=S_E$, such that right hand circular polarizations (+$S_3$) and left-hand circular polarizations (−$S_3$) remain unaffected by the PMD. Now, the perpendicular Poincaré subspace $S_\perp$ which is rotated by the PMD resulting from a polarization state's propagation through the polarization preserving optical fiber (indicated by the dashed arrows), is given by all linear (horizontal, vertical and diagonal) polarizations, i.e., by the subspace spanned by $S_1$ and $S_2$, resulting in the perpendicular Poincaré subspace $S_\perp$ $$S_\perp \ni S_k = \cos 2\theta_k S_1 + \sin 2\theta_k S_2 \qquad (ii)$$

forming a great circle on the surface of the Poincaré sphere.

As an optical fiber preserving a linear polarization, a so-called polarization maintaining fiber (PMF) can be used, which has a systematical (intended) linear birefringence. The birefringence stems from material anisotropies, which may be implemented by introducing stress bars along one lateral axis of the optical fiber during fabrication, leading to two different effective refractive indices for two specific orthogonal polarization modes (incident with respect to a determined optical axis), and thus, to different phase velocities of the orthogonal polarization modes. Thus, a PMF can "preserve" a polarization state that is polarized along either one of the principal axes of the PMF.

As an optical fiber preserving a circular polarization, a so-called twisted photonic crystal fiber (PCF) can be used. A twisted PCF can be fabricated, e.g., from fused silica, as a preferably hexagonal array of hollow channels, by spinning the preform during fiber drawing. For a twisted PCF of this kind, the diameter for the holes may be chosen preferably between 0.2 µm and 4 µm, most preferably between 1 µm and 2 µm, e.g., 1.6 µm, and the inter-hole spacing may be chosen preferably between 0.5 µm and 15 µm, most preferably between 3 µm and 7 µm, e.g., 5.2 µm. The outer fiber diameter may be chosen preferably between 30 µm and 1000 µm, most preferably between 150 µm and 400 Ξm, e.g., 240 µm. The twisting period may be chosen preferably between 0.5 mm and 10 mm, most preferably between 2 mm and 5 mm, e.g., 3.6 mm.

The advantage of the protected polarization subspace can be understood as follows:

In the quantum mechanical regime, at least two non-orthogonal signal states to be transmitted through the optical fiber may then be expressed in terms of the eigenstates either of the polarizations (i.e., $|H\rangle$, $|V\rangle$ for horizontal and vertical polarization or $|D\rangle$, $|A\rangle$ for diagonal and anti-diagonal polarization or $|L\rangle$, $|R\rangle$ for left and right had circular polarization), or of the Stokes operators (i.e., $|\pm s_1\rangle$, $|\pm s_2\rangle$, $|\pm s_3\rangle$, wherein $|+s_1\rangle$ denotes the eigenstate of the operator $\hat{S}_1$ to the positive eigenvalue +$s_1$). This means that a signal state preferably may be described as a suitable (possibly complex valued) linear combination of a pair of basis states $|\pm s_1\rangle$, $|\pm s_2\rangle$ or $|\pm s_3\rangle$ (or their respective Stokes parameters $\pm S_1$, $\pm S_2$ or $\pm S_3$).

A measurement of a signal state may then be performed by a projection onto an eigenstate of one of the Stokes operators (each of which lies along the principal axes through the Poincaré sphere) by means of a polarimeter, or onto an eigenstate that has been rotated over the Poincaré sphere, e.g., via the application of half and/or quarter wave plates.

Preferably, for the case that the set of signal states spans a great circle on the Poincaré sphere (which always holds if only two non-orthogonal signal states are used), a suitable polarization measurement to be performed on each of the signal states can be carried out by means of a set of suitable polarization eigenstates also lying on the great circle (i.e., by polarization eigenstates which are linearly dependent on the total set of signal states).

So, in case that one of the non-orthogonal polarizations for the signal states is given, e.g., by a linear horizontal polarization (i.e., by an eigenstate $|+s_1\rangle$ of the Stokes operator $\hat{S}_1$ with eigenvalue $+s_1$), and another signal state is given by, e.g., a linear diagonal polarization (i.e., by an eigenstate $|+s_2\rangle$ of the Stokes operator $\hat{S}_2$ with eigenvalue $+s_2$), a corresponding set of eigenstates to measure these signal states could be projection measurements onto eigenstates $|s_{msr}(\alpha)\rangle$ of an operator of the form $S_{msr}(\alpha)=\cos 2\alpha S_1+\sin 2\alpha S_2$ with suitably chosen angles $\alpha$ (note the similarity of $S_{msr}(\alpha)$ with $S_k$ according to eq. (ii), i.e., the perpendicular Poincaré subspace).

Two or more simultaneous quantum mechanical measurements of non-commuting operators (such as the Stokes operators) will always lead to additional noise penalties in the measurement results due to quantum uncertainty relations. An accurate measurement of a polarization state that has propagated through an optical fiber, and thus, has experienced a typically unknown degree of PMD, requires three polarization measurements and is therefore generally affected by the additional noise penalties. However, using a polarization preserving optical fiber for the transmission, and the knowledge of the preserved polarization subspace and of the perpendicular Poincaré subspace for the choice both of the set of non-orthogonal signal states and the polarization measurements to perform, one can reduce the required measurements by one (and thus, reduce the noise penalty), e.g., by choosing both the set of non-orthogonal signal states and the eigenstates for the polarization measurements out of the perpendicular Poincaré subspace.

In an embodiment, each signal state is prepared such that the representation of the corresponding polarization state on the Poincaré sphere is perpendicular to the representations of the pair of polarization states of the preserved polarization subspace, i.e., the signal state is prepared in one of the perpendicular Poincaré subspaces. Even though it is possible to prepare the signal states having a non-vanishing polarization component in the direction of the preserved polarization subspace, and thus, a smaller relative contribution in the perpendicular Poincaré subspace, from a practical measurement point of view it can be advantageous to have a vanishing component in the preserved polarization subspace, and thus, to have the polarization contributions concentrated in the perpendicular Poincaré subspace where the measurement is preferably performed, in order to increase the distinguishability of two non-orthogonal polarizations (in this case the perpendicular Poincaré subspace is a great circle on the Poincaré sphere). This is particularly useful for the case when the optical fiber preserves circular polarization, as measuring linear polarizations, i.e., a polarization measurement in the perpendicular Poincaré subspace after transmission of the respective signal state through the optical fiber for the mentioned case of preserved circular polarization, is typically easier to implement than measuring a circular polarization component. In this case, it is helpful to prepare the signal states as linearly polarized states.

However, in case that the optical fiber preserves a linear polarization, the preparation of the signal states and/or the polarization measurement may be performed in a polarization subspace containing the protected polarization subspace, preferably in the polarization subspace spanned by circular polarization and the linear polarization rotated by 45° with respect to the preserved one (i.e., diagonal polarizations).

In an embodiment of particular advantage, prior to the transmission of at least one signal state, a calibration signal is generated, the calibration signal is transmitted through the optical fiber, a polarization measurement is performed on the calibration signal after propagation through the optical fiber, and at least for several of the signal states, the polarization measurement is performed by means of a polarization eigenstate that is determined based on the result of the polarization measurement performed on the calibration signal, and/or by means of a Stokes operator corresponding to the polarization eigenstate. Preferably, the polarization measurement performed on the calibration signal is suitable for determining the action, and in particular, a rotation within the protected polarization subspace (i.e., a rotation of a polarization component in the perpendicular polarization subspace) that is induced by the PMD onto an arbitrary polarization state (classical or quantum) when propagating through the fiber. To this end, the calibration signal is preferably prepared as a classical signal, i.e., as a bright pulse, since for the purpose of determining said action of the PMD, no quantum correlation need to be measured, and the polarization measurement of the calibration state, e.g., may determine the three Stokes parameters $S_1$, $S_2$, $S_3$ at a time.

Then, the knowledge of the rotation angle allows for determining a polarization eigenstate that is suitable for measuring the signal states. For a circular polarization preserving fiber this is done preferably in a plane through the Poincaré sphere involving the two axes $S_1$, $S_2$ corresponding to respective linear polarizations. In particular, for the case of circular polarization preserved by the optical fiber, the perpendicular polarization subspace $S_\perp$ is spanned by the linear polarizations corresponding to $S_1$ and $S_2$. So, the initial state corresponding to $S_1$ will become an arbitrary polarization state corresponding to $S_k \in S_\perp$ (or a corresponding quantum state $|s_k\rangle$) rotated due to the PMD during propagation through the optical fiber by an angle $\theta_k$, i.e., $S_\perp \ni S_k = \cos 2\theta_k S_1 + \sin 2\theta_k S_2$.

A polarization eigenstate that is used for the polarization measurement of the at least several signal states (or the Stokes operator corresponding to said polarization eigenstate), can then be determined based on the rotation angle $\theta$, preferably by a corresponding rotation of the polarization eigenstate. So, in case that one of the non-orthogonal polarizations for the signal states is given by a linear horizontal polarization (i.e., by an eigenstate $|+s_1\rangle$ of the Stokes operator $\hat{S}_1$ with eigenvalue $+s_1$), a corresponding eigenstate to measure this signal state could be a projection measurement onto the basis $|+s_1\rangle$, $|-s_1\rangle$ (i.e., horizontally and vertically polarized states, respectively). Then, in order to correct for the PMD and the corresponding rotation of the signal state, a corresponding rotation of the basis for the polarization measurement as given above can be performed (e.g., via wave plates), the angle $\theta_k$ of the rotation being determined by the polarization measurement of the calibration signal.

In particular, the polarization measurement on the receiver site may be performed by randomly choosing either of the polarization eigenstate pairs $|\pm s_1\rangle$, $|\pm s_2\rangle$ and projecting the received signal state onto the $\theta_k$-rotated eigenstates $|\pm s_1\rangle$ or $|\pm s_2\rangle$ (i.e., performing a measurement of the orthogonal linear polarizations in either the $s_1$ or $s_2$ base by applying a suitable wave plate).

Since $|+s_2\rangle = (|+s_1\rangle + |-s_1\rangle)/\sqrt{2}$ and thus, $\langle +s_1|+s_2\rangle \neq 0$, a result is inconclusive if a (rotated) signal state is projected onto $|+s_1\rangle$ when measuring in the (rotated) basis of $|\pm s_1\rangle$, as in this case, it is not possible to distinguish whether the initial signal state has been $|+s_1\rangle$ or $|+s_2\rangle$ (which also has a contribution in direction of $s_1$). For measuring in the (rotated) basis of $|\pm s_1\rangle$, only the projection onto $|-s_1\rangle$ can unambiguously identify the initial signal state (as only $|+s_2\rangle$ can collapse onto $|-s_1\rangle$ when projected onto the basis $|\pm s_1\rangle$). A similar reasoning holds for the (rotated) basis of $|\pm s_2\rangle$ with respect to the signal state $|+S_2\rangle$.

The inconclusive results may be later discarded by communicating them from the receiver site to the sender site via a classical channel.

This may be particularly useful for the method for QKD. In an embodiment thereof, the bit values "zero" and "one" are used as elementary information values, wherein the bit values "zero" and "one" are encoded into two linear non-orthogonal polarization states (such as, e.g., horizontal and diagonal linear polarization for small signals, i.e., "zero" is assigned to $|+s_1\rangle = |H\rangle$ and "one" is assigned to $|+s_2\rangle = |D\rangle$) at the sender site. At the receiver site, a polarization measurement is performed on each signal state by means of one out of at least two rotated polarization eigenstates, the rotated polarization eigenstates being based on the two linear non-orthogonal polarization states and a rotation angle determined from the polarization measurement performed on the calibration signal.

Likewise, the inconclusive results may be later discarded by communicating them from the receiver site to the sender site via a classical channel, so the corresponding bit values whose signal states led to the inconclusive results do not enter in the key generation.

Another measurement strategy may be as follows: two non-orthogonal signal states $|s_{+,-}\rangle$, corresponding to polarizations $S_{+/-} = \cos 2\varepsilon S_1 \pm \sin 2\varepsilon S_2$, are sent. Depending on the mean photon number in the signal, $\varepsilon = \pi/8$ for single photons and very weak coherent states or $\varepsilon \ll \pi/8$ for coherent states with many photons, because the uncertainty range of a coherent state decreases as the mean photon number increases.

As a result of PMD the input states corresponding to polarizations $S_1$ and $S_2$ would exit the fiber as, respectively, $|s_{1k}\rangle$ and $|s_{2k}\rangle$, corresponding to $$S_{1k} = \cos 2\theta_k S_1 + \sin 2\theta_k S_2 \text{ and}$$

$$S_{2k} = -\sin 2\theta_k S_1 + \cos 2\theta_k S_2,$$

respectively. Therefore, the initially sent two non-orthogonal states $|s_{+,-}\rangle$ will exit the fiber as $|s_{k+,k-}\rangle$, corresponding to $S_{k+,k-} = \cos 2\varepsilon S_{1k} \pm \sin 2\varepsilon S_{2k}$ or expressed in terms of the $S_1$ and $S_2$ coordinates $$S_{k+,k-} = \cos(2\theta_k \pm 2\varepsilon)S_1 + \sin(2\theta_k \pm 2\varepsilon)S_2.$$

The preferred measurement procedure avoiding any quantum noise penalty would then be as follows: a time $\Delta t$ before the planned signal measurement, an intense calibration state $|s_1\rangle$ is sent and measured at the output of the fiber by splitting it equally on a polarization insensitive beam splitter and measuring $S_1$ in the one and $S_2$ in the other split beam. This determines $\theta_k$ and thus $|s_{1k}\rangle$. There is in principle a quantum noise penalty, but this is irrelevant because of the brightness of the measured coherent calibration pulse. Then, a time $\Delta t$ later, one launches one of the states $|s_{+,-}\rangle$ at the fiber input. In this scenario, one can follow a strategy in which only one Stokes operator measurement in the protected subspace will be performed. But there are other strategies. So, next these strategies will be discussed. The time difference $\Delta t$ should be shorter than the typical time scale for environmentally induced changes of the birefringence. To be sure one can send a second calibration pulse short after the signal measurement to check that $\theta_k$ did not change since the preceding calibration.

Following quantum state estimation theory, there are different strategies, minimum error estimation and unambiguous state estimation. The former always gives a result $|s_+\rangle$ or $|s_-\rangle$, but this will sometimes be incorrect. The latter gives three different results either the correct result $|s_+\rangle$ or $|s_-\rangle$ or announces that the measurement was inconclusive.

For minimum error estimation, in the example given above, one measures the eigenvalues of the Stokes operator $S_{2k}$ (the corresponding eigenstates of which are $|\pm s_{2k}\rangle$). If the outcome is positive, one estimates that the state is $|+s_{2k}\rangle$, and if the result is negative, one estimates that the state of interest is $|-s_{2k}\rangle$. Of course, there is an error rate, which can be reduced by introducing a threshold: But a threshold, however, also reduced the rate of results.

For unambiguous state discrimination, one will have to switch between measuring in the operator basis $S_{k+}$ or $S_{k-}$. If the measurement result is $s_{k+}$ in the basis $S_{k+}$ or if the result is $s_{k-}$ in the basis $S_{k-}$, then the measurement is inconclusive. However, if the result is $-s_{k+}$ in the basis $S_{k+}$ then the launched signal was $|s_-\rangle$, or if the result is $-s_{k-}$ in the basis $S_{k-}$, then the input signal is estimated to be $|s_+\rangle$ with full confidence.

Both strategies can be followed when measuring discrete or continuous quantum variables. Again, the inconclusive results in unambiguous state discrimination, or the measurement results below the threshold in minimum error estimation if one uses a threshold may be later discarded by communicating them from the receiver site to the sender site via a classical channel.

The afore-mentioned measurement of the PMD action onto a calibration signal, also allows for an application of the calibration measurements to an arbitrary optical fiber, i.e., a fiber which is not necessarily polarization preserving. Then, in an alternative implementation which constitutes an invention in its own right, for sequentially transmitting at least two non-orthogonal polarization states of light (such as, e.g., $|+s_1\rangle$ and $|+s_2\rangle$) through an optical fiber which possibly may not be polarization preserving, and in particular, is not polarization preserving, one may first send, one after another, two different calibration signals which correspond to two non-orthogonal polarizations. Each of the calibration signals preferably is bright enough to be considered a classical signal (i.e., so that quantum effects may be neglected, in particular for measuring the calibration signal), but most preferably be "weak enough" that non-linear effects in the fiber might still be also neglected, i.e., the brightness should not exceed a threshold above which non-linear effects in the fiber might occur in a non-negligible way. Then, the action of the fiber due to PMD onto each of the calibration pulses may be determined via a "classical" measurement (i.e., without any whatsoever quantum noise penalty).

The action of PMD in the arbitrary fiber onto an arbitrary polarization mode (classical, i.e., "bright", or quantum) is generally given by a unitary evolution. This unitary evolution, on the Poincaré sphere, translates to a rotation about an axis which is a priori unknown for an arbitrary fiber, and which also may change due to changes in the external conditions such as mechanical strain on the fiber or temperature changes. In the case of a polarization preserving optical fiber, the preserved polarizations (i.e., the preserved polarization subspace) "fix" one degree of freedom of this rotation, in the sense that the rotation axis can be known from the preserved polarizations (i.e., from the corresponding subspace). Then, the amount of rotation about this axis may be determined by means of measuring the rotation that PMD causes on one single calibration signal.

In the case of an arbitrary fiber, both the rotation axis and the rotation amount (i.e., the angle) are unknown, but may be determined from the action of the rotation onto two (classical/bright) calibration signals. There exists exactly one rotation of the Poincaré sphere's surface (with a defined axis and a defined angle) which transforms the plane defined by the two calibration signals (corresponding to two points on the surface) and by the center of the Poincaré sphere into another plane defined by the two calibration signals after propagation through the fiber (and thus, rotated to two different points on the surface, maintaining the length of the geodesic arc connecting the two points).

From the two calibration measurements (i.e., the measurements of the PMD action on the respective calibration signal), the PMD-caused rotation on the Poincaré surface may be characterized. This can be seen as follows: The first calibration signal on the input side In1 and its corresponding measurement result Out1 after propagation through the fiber (and the resulting PMD rotation) define a continuous family of rotations that might transform In1 into Out1, wherein each of these rotations are characterized by a corresponding small circle through In1 and Out1, except for the particular rotation corresponding to the great circle through In1 and Out1. The rotation axes of all these rotations lie in the symmetry plane between In1 and Out1 that goes through the center of the Poincaré sphere (since each of the intersection points of the plane with the Poincaré sphere's surface has the same distance to In1 and to Out1, which is necessary for a small circle with a center on the line between such an intersection point and the sphere's center).

Thus, upon measuring Out1, the first symmetry plane between In1 and Out1 is known. From measuring Out2, a second symmetry plane between In2 and Out2 can be derived (the axes of all possible rotations that map In2 onto Out2 lie in this second symmetry plane through the Poincaré sphere's center). The rotation axis of interest for the PMD rotation is the intersection line of both planes, and the rotation angle can be easily obtained from In1, Out1 and the rotation axis.

Then, from the knowledge about this rotation, one may derive the action on the non-orthogonal signal states and may determine suitable quantum measurements for the signal states (e.g., measurements in the plane that is spanned by the signal state's representations on the Poincaré sphere and its center, and rotated by the determined rotation). Preferably, to this end the two calibration signals are chosen as the classical counterparts of two of the signal states (or of the two signal states, if applying).

As the polarization rotation on the Poincaré sphere caused by the PMD may change over time due to changes in the mechanical stress or temperature of the fiber, the calibration measurements (of both calibration pulses) are preferably repeated on a timescale relevant for the changes. As the main cause for the changes is given by mechanical vibrations in the low kHz regime (at most), this timescale is typically between 10 µs and 1 ms, and most preferably in the range of 100 µs to 1 ms. A repetition of the calibration measurements shall be preferably repeated in this timescale (e.g., after 100 µs or after 1 ms). Also, a repetition of the calibration measurement may be performed as a control after a block of signal states sent through the fiber in order to verify that the rotation axis and/or its angle have remained sufficiently constant since the last calibration measurement (of a pair of calibration signals). In case that the rotation axis and/or angle have not remained constant over said time period, the measurement results from the corresponding signal states may be discarded for communication.

The invention furthermore discloses an apparatus for transmitting signals of polarization states of light, comprising: a polarization state generator to be disposed at a sender site, a polarization state analyzer to be disposed at a receiver site, and a polarization preserving optical fiber optically connecting the polarization state generator and the polarization state analyzer, wherein the polarization state generator is configured to prepare a signal state as one out of a set of at least two pre-determined non-orthogonal polarization states of light, and to couple the signal state into the optical fiber. The polarization state analyzer is configured to perform a polarization measurement on a signal state that is received via the optical fiber.

The apparatus may be embedded in a quantum communication network, in particular a QKD network. The apparatus in particular may be used for a transmission of polarization states of light where a free propagation of the light cannot be established for the entire distance to cover between the sender site and the receiver site. In particular, the quantum communication network may comprise of further quantum communication devices, e.g., for a free field transmission of quantum states, and the apparatus may be used to transmit quantum states towards a sender site of such a free field transmission of quantum states (e.g., the apparatus may be used for quantum state transmission in a building or in a block of buildings).

The apparatus according to the invention shares the advantages of the method for transmitting signals of polarization states and of the method for QKD, according to the invention. Particular assets of the method for transmitting signals of polarization states, as well as of the method for QKD, and of their respective embodiments may be transferred, in an analogous way, to the apparatus for transmitting signals of polarization states of light, and vice versa.

The invention furthermore discloses the use of a polarization-preserving optical fiber for sequentially transmitting polarization states of light, in particular for the purpose of QKD, the polarization states to be chosen out of a set of at least two non-orthogonal polarization states. The use of a polarization-preserving optical fiber for sequentially transmitting polarization states of light, according to the invention, shares the advantages of the method for transmitting signals of polarization states and of the method for QKD, according to the invention. Particular assets of the method for transmitting signals of polarization states, as well as of the method for QKD, and of their respective embodiments may be transferred, in an analogous way, to the mentioned use.

Other features which are considered as characteristic for the invention are set forth in the appended claims.

Although the invention is illustrated and described herein as embodied in a method for sequentially transmitting signals of polarization states of light through an optical fiber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Parts and variables corresponding to one another are provided with the same reference numerals in each case of occurrence for all figures.

DETAILED DESCRIPTION OF THE INVENTION

Figure 2:
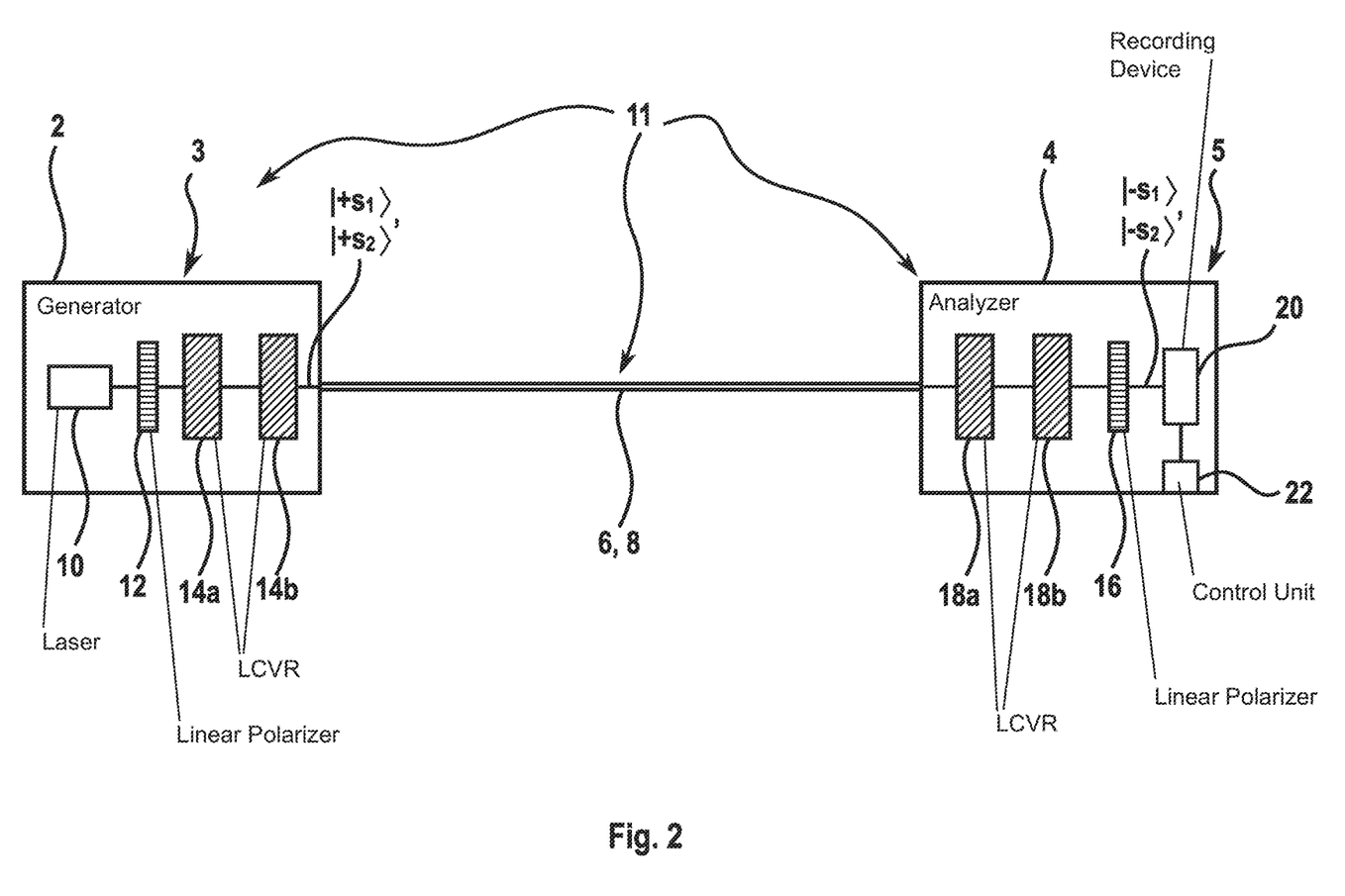
FIG. 2 is a block circuit diagram of an apparatus for a transmission of polarization states of light.

Referring now to the figures of the drawings in detail and first, particularly to FIG. 2 thereof, there is shown schematically a block circuit diagram of an apparatus 11 for the transmission of polarization states of light. The apparatus 11 includes a polarization state generator 2 at a sender site 3 and a polarization state analyzer 4 at a receiver site 5, which are connected to each other via an optical fiber 6 which is polarization preserving. The optical fiber 6 in the present case is preferably given by a twisted PCF 8 but could also be given by a PMF or any other type of optical fiber preserving two orthogonal polarizations.

The polarization state generator 2 in the embodiment shown in FIG. 2 contains a laser 10, a linear polarizer 12 which is preferably fixed, and two liquid crystal variable retarders (LCVR) 14a, 14b, with their optical axes aligned at 45° and 22.5° with respect to the reference axis defined by the beam of the laser 10 (as well as the z-axis of the optical fiber 6). An optical retardance induced by each of the LCVRs 14a, 14b can be controlled by applying a control voltage across the cells of the respective LCVR, so that in particular, any of the horizontal, vertical, diagonal and anti-diagonal linear polarizations may be generated by the polarization state generator 2. In fact, the polarization state generator 2 as shown is also capable of generating left and right had circular polarizations. Depending on the signal states to be generated, the LCVRs 14a, 14b may also be substituted by ordinary half and quarter wave plates, respectively, for the present purpose.

The polarization state analyzer 4 in the present case contains a linear polarizer 16 and two LCVRs 18a, 18b in a similar setup as in the polarization state generator 2, as well as a recording device 20. As an alternative (not shown), the polarization state analyzer 4 may comprise a polarizer and a rotating quarter-wave plate.

Focusing lenses in order to couple in the polarization states into the optical fiber 6, as well as collection lenses at the end of the optical fiber 6 are omitted in FIG. 2.

The polarization state generator 2 now sequentially generates signal states in each case as one out of two non-orthogonal linear polarization states, e.g., $|+s_1\rangle$ (corresponding to $|H\rangle$) and $|+s_2\rangle$ (corresponding to $|D\rangle$), by applying the corresponding control voltages to the LCVRs 14a, 14b. Each of these states propagates through the twisted PCF 8. As the twisted PCF 8 preserves circular polarizations, the polarization of each signal state gets rotated due to PMD on the Poincaré sphere in the way described in FIG. 1B, i.e., in the circle spanned by $S_1$ and $S_2$. The polarization state analyzer 4 then performs polarization state measurements in this plane, e.g., by projecting randomly onto one of the polarization eigenstates $|-s_1\rangle$, $|-s_2\rangle$ (corresponding to $|V\rangle$, $|A\rangle$), wherein these polarization eigenstates have been suitably rotated along the circle spanned by $S_1$ and $S_2$ by an angle that can be determined by a calibration measurement via a bright pulse prior to transmitting the signal states. The measurement results are then processed by a control unit 22.

The apparatus 11 may be part of a QKD network (not shown), wherein the signal states are used for a QKD protocol that also employs post-processing of the measurement results via classical communication between the sender site 3 and the receiver site 5.

Figure 3:
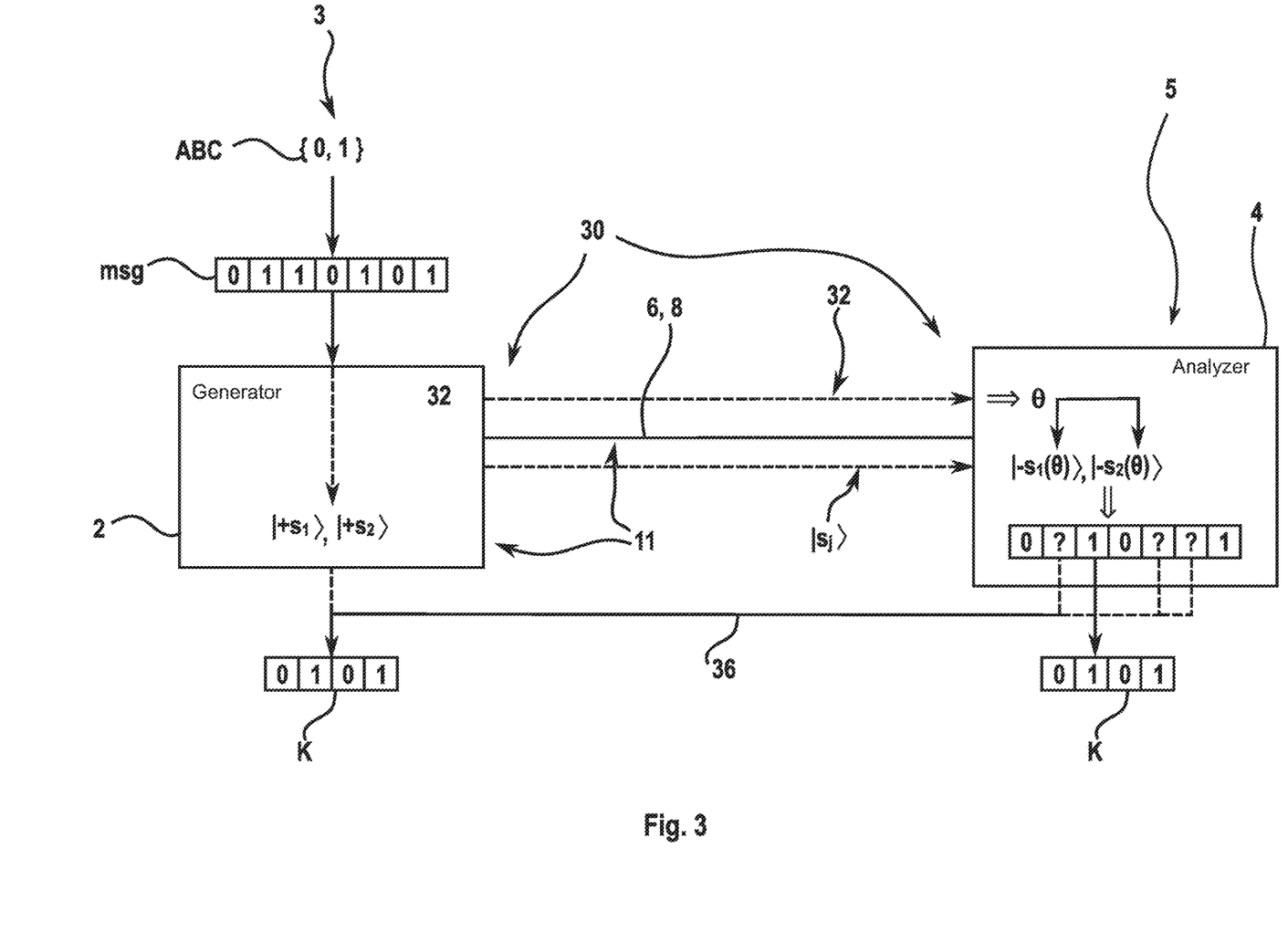
FIG. 3 is a flow chart of a QKD protocol, the QKD protocol employing a method for transmitting polarization states of light through the optical fiber.

In FIG. 3, a schematic flow chart of a QKD protocol is shown. The QKD protocol is using a method 30 for sequentially transmitting signals of polarization states of light through an optical fiber.

The method 30 provides for sequentially sending signal states $|s_j\rangle$ that are chosen out of the set of non-orthogonal polarization states $|+s_1\rangle$, $|+s_2\rangle$ (, i.e., the positive-eigenvalue eigenstates of the Stokes operators $S_1$ and $S_2$, corresponding to $|H\rangle$, $|D\rangle$) over an optical fiber 6 which preserves circular polarizations, from a sender site 3 to a receiver site 5 by means of the apparatus 11 shown in FIG. 2.

In the framework of the method 30, a calibration signal 32 is prepared in the polarization state generator 2, and sent through the optical fiber 6 to the polarization state analyzer 4, where a polarization measurement is performed on the received calibration signal 32. From this measurement, a rotation angle θ is determined, corresponding to the rotation of polarization components in the plane $S_1$-$S_2$ of the Poincaré sphere, the rotation being caused by the PMD due to the propagation of any polarization state (i.e., also of the calibration signal 32) through the optical fiber 6.

Now after the calibration step, a signal state $|s_j\rangle$ is sent. In order to determine which of the polarization states $|+s_1\rangle$, $|+s_2\rangle$ has been sent as the signal state $|s_j\rangle$, the received signal states $|s_j\rangle$ each are randomly projected onto one of the perpendicular polarization states $|-s_{1k}\rangle$, $|-s_{2k}\rangle$ (i.e., the negative-eigenvalue eigenstates of the Stokes operators two Stokes operators $S_{1k}$, $S_{2k}$) that have been rotated by the rotation angle $\theta_k$ (by a corresponding application of the respective control voltages to the LCVRs 18*a*, 18*b* for implementing the rotations).

For the QKD protocol, the bit values "zero" 0 and "one" 1 are chosen as elementary information values of an alphabet ABC. Then, a classical message msg is prepared from said bit values "zero" 0 and "one" 1 at the sender site 3. The polarization states $|+s_1\rangle$, $|+s_2\rangle$ (i.e., the positive-eigenvalue eigenstates of the Stokes operators $S_1$ and $S_2$) corresponding to each of the elementary information values (0,1) of the classical message msg are sequentially prepared as signal states $|s_j\rangle$ by the polarization state generator 2, and sequentially transmitted to the receiver site 5 via the optical fiber 6.

At the receiver site 5, the received signal states $|s_j\rangle$ are randomly projected onto the rotated perpendicular polarization states $|-s_{1k}\rangle$, $|-s_{2k}\rangle$ (, i.e., the negative-eigenvalue eigenstates of the Stokes operators two Stokes operators $S_{1k}$, $S_{2k}$) as described above, in order to determine which of the polarization states $|+s_1\rangle$, $|+s_2\rangle$ has been sent as a signal state $|s_j\rangle$. Then, whenever a projection onto the respective orthogonal component in the proper rotated basis occurs (i.e., a projection onto $|-s_{1k}\rangle$ for the polarization state $|+s_1\rangle$ sent as signal state $|s_j\rangle$), there is a conclusive result from the polarization measurement about the bit value "zero" 0 or "one" 1, respectively, in the classical message msg. Otherwise, i.e., if the polarization state $|+s_1\rangle$, $|+s_2\rangle$ sent as signal state $|s_j\rangle$ does not match the rotated perpendicular polarization state $|-s_{1k}\rangle$, $|-s_{2k}\rangle$ (e.g., a projection onto $|-s_{1k}\rangle$ for the polarization state $|+s_2\rangle$ sent as signal state $|s_j\rangle$), the measurement result is inconclusive.

The inconclusive measurement results can now be discarded by means of classical communication 36 between the sender site 3 and the receiver site 5, e.g., the receiver site 5 may broadcast which of the sent signal states $|s_j\rangle$ (i.e., their numerical positions in the stream of signal states $|s_j\rangle$) led to inconclusive measurement results, and the corresponding bit value "zero" 0 and "one" 1, respectively, are discarded both on the sender site 3 and the receiver site 5, from the classical message msg. The resulting stream of bit values can either be directly taken as a classical key K, or used for obtaining such a classical key via further privacy amplification steps (not shown). Note that this QKD protocol is of the "BB84" type (which uses two pairs of non-orthogonal polarizations as signal states, each of the signal states having an orthogonal counterpart in the respective other pair). The invention may also easily be applied to protocols of the "B92" type which uses only two non-orthogonal polarizations as signal states.

Figure 4:
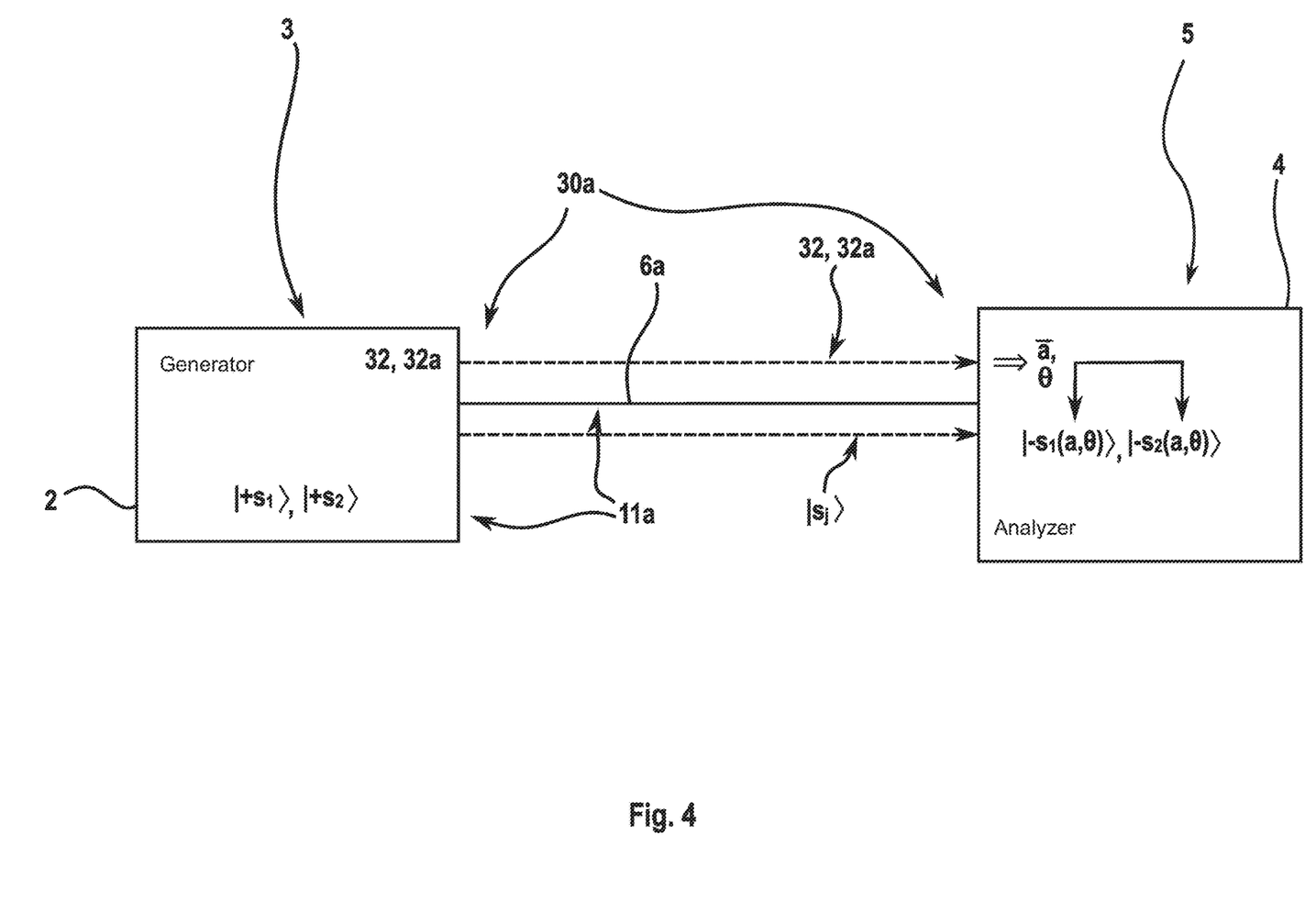
FIG. 4 is a flow chart of an alternative method for transmitting polarization states of light through an optical fiber.

FIG. 4 shows a schematic flow chart of an alternative method 30*a* for sequentially transmitting signals of polarization states of light through an arbitrary optical fiber.

The method 30*a* provides for sequentially sending signal states $|s_j\rangle$ that are chosen out of the set of non-orthogonal polarization states $|+s_1\rangle$, $|+s_2\rangle$ (, i.e., the positive-eigenvalue eigenstates of the Stokes operators $S_1$ and $S_2$, corresponding to $|H\rangle$, $|D\rangle$) over an arbitrary optical fiber 6*a*, i.e., a fiber which is not known to preserve circular polarizations, from a sender site 3 to a receiver site 5, by means of an apparatus 11*a* similar to the apparatus 11 shown in FIG. 2, and accordingly adapted for the method 30*a*.

In the framework of the method 30*a*, two classical calibration signals 32, 32*a* corresponding to non-orthogonal polarizations are prepared in the polarization state generator 2, and sent through the arbitrary optical fiber 6*a* to the polarization state analyzer 4, where a polarization measurement is performed on each of the received calibration signals 32, 32*a*. From these measurements, a rotation axis $\vec{a}$ and a rotation angle $\theta$ are determined, corresponding to the rotation of polarization components in an arbitrary plane through the center of Poincaré sphere/the plane perpendicular to the rotation axis $\vec{a}$), the rotation being caused by the PMD due to the propagation of any polarization state (i.e., also of the calibration signals 32, 32*a*) through the optical fiber 6*a*.

After the calibration step described above, a signal state $|s_j\rangle$ is sent. In order to determine which of the polarization states $|+s_1\rangle$, $|+s_2\rangle$ has been sent as the signal state $|s_j\rangle$, the received signal states $|s_j\rangle$ each are randomly projected onto one of the perpendicular polarization states $|-s_{1k}\rangle$, $|-s_{2k}\rangle$ (i.e., the negative-eigenvalue eigenstates of the Stokes operators two Stokes operators $S_{1k}$, $S_{2k}$) that have been rotated by the rotation angle $\theta_k$ around the rotation axis $\vec{a}$ (by a corresponding application of the respective control voltages to the LCVRs 18*a*, 18*b* for implementing the rotations).

Even though the invention has been illustrated and described in detail with help of a preferred embodiment example, the invention is not restricted by this example. Other variations can be derived by a person skilled in the art without leaving the extent of protection of this invention.

The following is a summary list of reference numerals and the corresponding structure used in the above description of the invention:

0 bit value zero
1 bit value one
2 polarization state generator
3 sender site
4 polarization state analyzer
5 receiver site
6(*a*) polarization preserving (/arbitrary) optical fiber
8 twisted PCF
10 laser
11, 11*a* apparatus
12 linear polarizer
14*a*, 14*b* LCVR
16 linear polarizer
18*a*, 18*b* LCRV
20 recording device
22 control unit
30 method
32, 32*a* calibration signal
36 classical communication
ABC alphabet
K classical key
msg classical message
ps1, ps2 Poincaré sphere
$S_1$, $S_2$, $S_3$ Stokes parameters (basis)
$S_\perp$ perpendicular polarization subspace
$S_E$ protected polarization subspace
$S_k$ polarization (in the perpendicular polarization subspace)
$|+s_1\rangle$, $|+s_2\rangle$ set of non-orthogonal polarization states
$|-s_{1k/2k}\rangle$ rotated polarization eigenstate
$|s_j\rangle$ signal state

The invention claimed is:

1. A method for sequentially transmitting signals of polarization states of light through an optical fiber, the optical fiber being a polarization preserving optical fiber, which comprises the step of:

performing, prior to a transmission of a signal state, the sub-steps of:

generating a calibration signal;
transmitting the calibration signal through the optical fiber; and
performing a polarization measurement on the calibration signal after propagation through the optical fiber;
preparing, for each signal, the signal state as one out of a set of at least two non-orthogonal polarization states of light, sent through the optical fiber from a sender site to a receiver site, and wherein the polarization preserving optical fiber defines a preserved polarization subspace on a Poincaré sphere containing representations of a pair of polarization states which remain unaffected upon a propagation through the polarization preserving optical fiber;
performing on each said signal state, after transmission, a polarization measurement in a perpendicular Poincaré subspace which is characterized in that each representation of a polarization state out of the perpendicular Poincaré subspace is perpendicular to representations on the Poincaré sphere of the pair of polarization states of the preserved polarization subspace; and
performing, at least for several signal states, the polarization measurement by means of a polarization eigenstate that is determined based on a result of the polarization measurement performed on the calibration signal, and/or by means of a Stokes operator corresponding to the polarization eigenstate.

2. The method according to claim 1, wherein the polarization preserving optical fiber defines a protected polarization subspace on the Poincaré sphere such that a representation of a polarization state out of the protected polarization subspace, upon a propagation of a corresponding polarization state through the optical fiber, is protected against dispersing out of the protected polarization subspace.

3. The method according to claim 1, which further comprises using as the optical fiber, an optical fiber preserving a linear polarization.

4. The method according to claim 1, which further comprises using as the optical fiber, an optical fiber preserving a circular polarization.

5. The method according to claim 4, which further comprises using as the optical fiber, a twister photonic crystal fiber.

6. The method according to claim 1, wherein each said signal state is prepared such that a representation of a corresponding polarization state on the Poincaré sphere is perpendicular to the representations of the pair of polarization states of the preserved polarization subspace.

7. The method according to claim 1,
wherein, by means of the polarization measurement performed on the calibration signal, a rotation angle is determined, the rotation angle corresponding to a rotation of a polarization component in the perpendicular Poincaré subspace, the rotation being induced to a representation of a polarization state on the Poincaré sphere when propagating through the optical fiber; and
wherein the polarization eigenstate or the Stokes operator that is used for the polarization measurement of each of the at least several signal states, is determined based on the rotation angle.

8. An apparatus for transmitting signals of polarization states of light, the apparatus comprising:
a polarization state generator disposed at a sender site;
a polarization state analyzer disposed at a receiver site; and
a polarization preserving optical fiber optically connecting said polarization state generator and said polarization state analyzer, wherein said polarization preserving optical fiber defines a preserved polarization subspace on a Poincaré sphere containing representations of a pair of polarization states which remain unaffected upon a propagation through said polarization preserving optical fiber;
said polarization state generator configured to generate a calibration signal and transmit the calibration signal through said polarization preserving optical fiber;
said polarization state analyzer configured to perform a polarization measurement on the calibration signal after propagation through said polarization preserving optical fiber;
said polarization state generator configured to prepare the signal state as one out of a set of at least two predetermined non-orthogonal polarization states of light, and to couple the signal state into said polarization preserving optical fiber; and
said polarization state analyzer configured to perform a polarization measurement on the signal state that is received via said polarization preserving optical fiber, said polarization state analyzer configured to perform on each said signal state, after transmission, the polarization measurement in a perpendicular Poincaré subspace which is characterized in that each representation of a polarization state out of the perpendicular Poincaré subspace is perpendicular to representations on the Poincaré sphere of the pair of polarization states of the preserved polarization subspace; and
said polarization state analyzer configured to perform, at least for several signal states, the polarization measurement by means of a polarization eigenstate that is determined based on a result of the polarization measurement performed on the calibration signal, and/or by means of a Stokes operator corresponding to the polarization eigenstate.

9. An operating method, which comprises the steps of:
performing, prior to a transmission of a signal state, the sub-steps of:
generating a calibration signal;
transmitting the calibration signal through a polarization-preserving optical fiber; and
performing a polarization measurement on the calibration signal after propagation through the polarization-preserving optical fiber;
using the polarization-preserving optical fiber for sequentially transmitting polarization states of light, the polarization states of light are chosen out of a set of at least two non-orthogonal polarization states, wherein the polarization-preserving optical fiber defines a preserved polarization subspace on a Poincaré sphere containing representations of a pair of polarization states which remain unaffected upon a propagation through the polarization preserving optical fiber;
performing on each said signal state, after transmission, a polarization measurement in a perpendicular Poincaré subspace which is characterized in that each representation of a polarization state out of the perpendicular Poincaré subspace is perpendicular to representations on the Poincaré sphere of the pair of polarization states of the preserved polarization subspace; and
performing, at least for several signal states, the polarization measurement by means of a polarization eigenstate that is determined based on a result of the polarization measurement performed on the calibration signal, and/or by means of a Stokes operator corresponding to the polarization eigenstate.

10. The operating method according to claim 9, which further comprises using the polarization-preserving optical fiber for sequentially transmitting the polarization states of light for quantum key distribution.

* * * * *